(12) United States Patent
Miyatake et al.

(10) Patent No.: US 8,743,444 B2
(45) Date of Patent: Jun. 3, 2014

(54) OPTICAL SCANNING DEVICE, IMAGE FORMING APPARATUS, SCANNING LENS, AND MOLDING METHOD OF THE SCANNING LENS

(75) Inventors: Naoki Miyatake, Kanagawa (JP); Tadashi Nakamura, Tokyo (JP); Eiichi Hayashi, Kanagawa (JP); Chieko Hatashita, Kanagawa (JP); Go Takahashi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 154 days.

(21) Appl. No.: 13/422,907

(22) Filed: Mar. 16, 2012

(65) Prior Publication Data

US 2012/0236380 A1 Sep. 20, 2012

(30) Foreign Application Priority Data

Mar. 16, 2011 (JP) ................... 2011-057363

(51) Int. Cl.
*G02B 26/08* (2006.01)

(52) U.S. Cl.
USPC .................. 359/205.1; 359/204.1; 359/204.2

(58) Field of Classification Search
USPC .......... 359/204.1–207.11, 662; 347/233, 244, 347/258–260
See application file for complete search history.

(56) References Cited

U.S. PATENT DOCUMENTS

| | | | |
|---|---|---|---|
| 5,680,254 A | 10/1997 | Ueda et al. | |
| 6,621,512 B2 | 9/2003 | Nakajima et al. | |
| 6,771,300 B2 | 8/2004 | Amada et al. | |
| 6,813,051 B2 | 11/2004 | Suzuki et al. | |
| 6,987,593 B2 | 1/2006 | Hayashi et al. | |
| 7,050,082 B2 | 5/2006 | Suzuki et al. | |
| 7,050,210 B2 | 5/2006 | Atsuumi et al. | |
| 7,088,484 B2 | 8/2006 | Hayashi et al. | |
| 7,161,724 B1 | 1/2007 | Miyatake | |
| 7,167,288 B2 | 1/2007 | Miyatake et al. | |
| 7,277,212 B2 | 10/2007 | Miyatake et al. | |
| 7,385,181 B2 | 6/2008 | Miyatake et al. | |
| 7,411,712 B2 | 8/2008 | Nakajima et al. | |
| 7,471,434 B2 | 12/2008 | Nakamura et al. | |

(Continued)

FOREIGN PATENT DOCUMENTS

| JP | 2002-160268 | 6/2002 |
|---|---|---|
| JP | 3492971 | 11/2003 |

(Continued)

OTHER PUBLICATIONS

U.S. Appl. No. 13/342,510, filed Jan. 3, 2012, Arai, et al.

*Primary Examiner* — James Phan
(74) *Attorney, Agent, or Firm* — Oblon, Spivak, McClelland, Maier & Neustadt, L.L.P.

(57) ABSTRACT

An optical scanning device that scans a plurality of surfaces to be scanned in a main scanning direction by using a light beam includes: a plurality of light sources; a light deflector that deflects a plurality of light beams emitted from the light sources; and a scanning optical system that individually guides each one of the light beams deflected by the light deflector to a corresponding one of the surfaces to be scanned. The scanning optical system includes one scanning lens shared by the light beams, and at least one surface of the scanning lens has a plurality of optical surfaces corresponding to the plurality of light beams disposed in a sub-scanning direction with a flat surface provided between the optical surfaces.

11 Claims, 17 Drawing Sheets

(56) References Cited

U.S. PATENT DOCUMENTS

| | | |
|---|---|---|
| 7,538,925 B2 | 5/2009 | Miyatake |
| 7,551,337 B2 | 6/2009 | Hirakawa et al. |
| 7,633,663 B2 | 12/2009 | Hirakawa et al. |
| 7,643,193 B2 | 1/2010 | Nakamura et al. |
| 7,728,863 B2 | 6/2010 | Miyatake et al. |
| 7,729,031 B2 | 6/2010 | Nakamura et al. |
| 7,764,301 B2 | 7/2010 | Suzuki et al. |
| 7,855,818 B2 | 12/2010 | Nakamura |
| 7,869,110 B2 | 1/2011 | Nakamura et al. |
| 7,872,813 B2 | 1/2011 | Kimura et al. |
| 7,898,739 B2 | 3/2011 | Hayashi et al. |
| 7,924,487 B2 | 4/2011 | Miyatake et al. |
| 7,929,007 B2 | 4/2011 | Miyatake |
| 7,961,211 B2 | 6/2011 | Nakamura |
| 7,969,635 B2 | 6/2011 | Miyatake |
| 7,999,970 B2 | 8/2011 | Miyatake |
| 8,004,553 B2 | 8/2011 | Hayashi et al. |
| 8,023,166 B2 | 9/2011 | Nakamura et al. |
| 8,077,368 B2 | 12/2011 | Miyatake |
| 8,089,674 B2 | 1/2012 | Hayashi et al. |
| 2006/0262372 A1 | 11/2006 | Hayashi |
| 2008/0068691 A1 | 3/2008 | Miyatake |
| 2008/0180772 A1 | 7/2008 | Miyatake et al. |
| 2009/0073523 A1 | 3/2009 | Nakamura |
| 2009/0168188 A1 | 7/2009 | Takahashi et al. |
| 2010/0091083 A1 | 4/2010 | Itami et al. |
| 2010/0091342 A1 | 4/2010 | Nakamura |
| 2010/0238520 A1* | 9/2010 | Nagata .......................... 358/475 |
| 2011/0058230 A1 | 3/2011 | Soeda et al. |
| 2011/0110687 A1 | 5/2011 | Miyatake et al. |
| 2011/0304896 A1 | 12/2011 | Takahashi et al. |

FOREIGN PATENT DOCUMENTS

| | | |
|---|---|---|
| JP | 2004-294713 | 10/2004 |
| JP | 2006-72288 | 3/2006 |
| JP | 2007-155838 | 6/2007 |
| JP | 4017927 | 9/2007 |
| JP | 2008-15139 | 1/2008 |
| JP | 4454186 | 2/2010 |

* cited by examiner

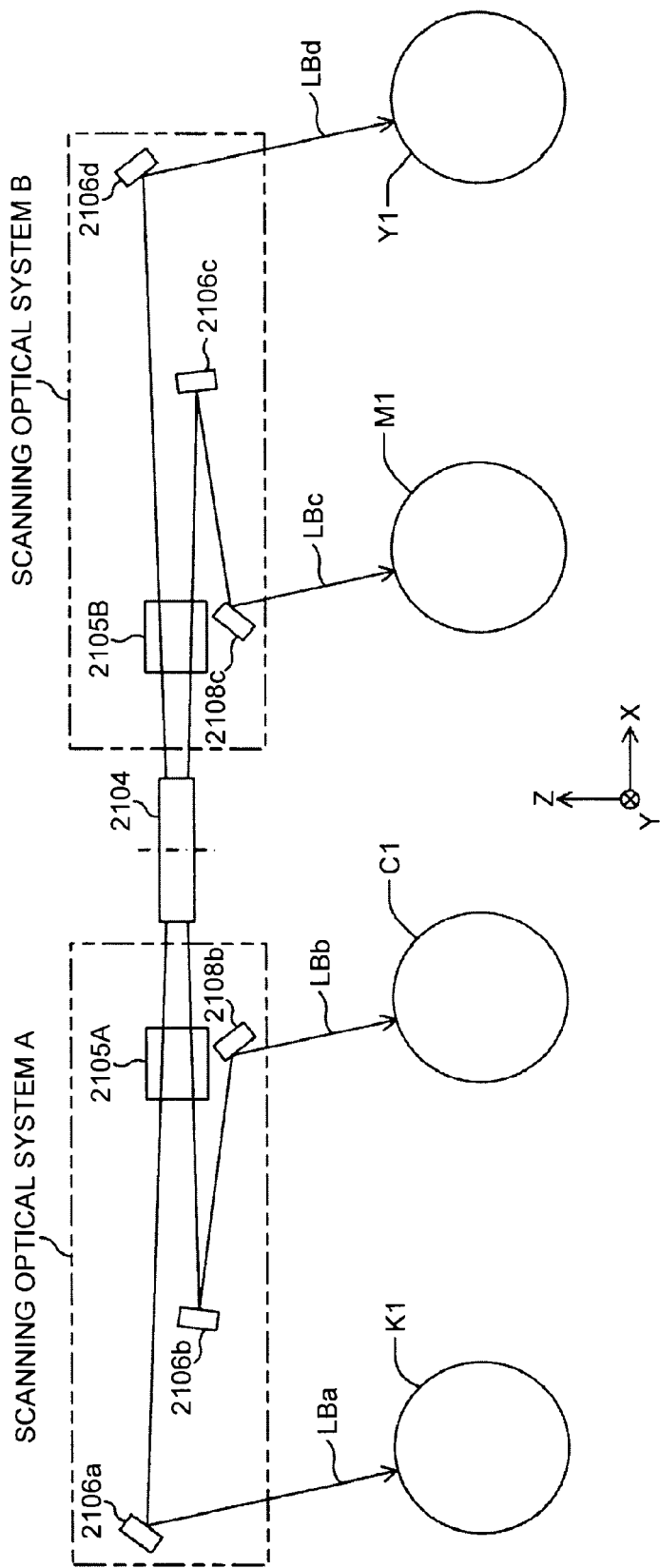

FIRST EXIT OPTICAL SURFACE

FLAT SURFACE

INCIDENT SIDE     EXIT SIDE

Z

SECOND EXIT OPTICAL SURFACE

INCIDENT SIDE     EXIT SIDE

MAIN SCANNING CORRESPONDING DIRECTION

OPTICAL SCANNING DEVICE, IMAGE FORMING APPARATUS, SCANNING LENS, AND MOLDING METHOD OF THE SCANNING LENS

CROSS-REFERENCE TO RELATED APPLICATIONS

The present application claims priority to and incorporates by reference the entire contents of Japanese Patent Application No. 2011-057363 filed in Japan on Mar. 16, 2011.

BACKGROUND OF THE INVENTION

1. Field of the Invention

The present invention relates to an optical scanning device, an image forming apparatus, a scanning lens, and a molding method of the scanning lens, and more specifically, to an optical scanning device for scanning a surface to be scanned using a light beam, an image forming apparatus equipped with the optical scanning device, a scanning lens molded by resin injection, and a molding method of the scanning lens by injection molding.

2. Description of the Related Art

In recent years, advancement has been made in a high speed color printing method of an electrophotographic image forming apparatus used in a laser printer, a laser plotter, a digital copying machine, a laser facsimile, or a multifunction peripheral including the same, and a tandem-type image forming apparatus has prevailed by including a plurality of (normally four) photosensitive elements serving as image carriers.

In the tandem-type image forming apparatus, the photosensitive elements are disposed along a conveying direction of a recording sheet. A plurality of light beams emitted from a plurality of light sources corresponding to the respective photosensitive elements is deflected by a light deflector to simultaneously expose the surfaces of the respective photosensitive elements through a corresponding scanning optical system (scanning image-forming optical system), thereby to form respective latent images thereon. These latent images are made visible with developing units using developers of different colors such as yellow, magenta, cyan, and black, sequentially superimposed and transferred onto the same recording sheet, and fixed, so that a color image is formed thereon.

However, the tandem-type image forming apparatus requires a plurality of light sources with the number thereof corresponding to that of the photosensitive elements, and accordingly, there has been an inconvenience in that an increase in the number of components raises a manufacturing cost and enlarges the device.

A proposal has been made for a common use of the scanning lens by a plurality of light beams directed toward the photosensitive elements that are different from each other (see, for example, Japanese Patent Application Laid-open No. 2002-160268).

A proposal for reducing the cost has also been made for the light deflector, on a deflecting reflective surface on which light beam is obliquely incident with respect to a sub-scanning direction (see, for example, Japanese Patent Application Laid-open No. 2003-5114).

However, in the obliquely incident optical system, there has been an inconvenience in that the light beam directed to a peripheral image height in the vicinity of an edge of an image forming region on the photosensitive element, in particular, is incident on a scanning lens in a twisted state, which may increase a wave aberration. In this case, the optical performance at the surface of the photosensitive element significantly degrades, the diameter of the beam spot becomes large, and higher image quality is inhibited. Furthermore, a color shift may occur when the toner images of the respective colors are superimposed because the magnitude in the bending of a scanning line differs from one light beam to another depending on an angle of oblique incidence of the light beam.

A method for correcting the degradation of the optical properties specific to the obliquely incident system on the surface of the photosensitive element has been proposed (see, for example, Japanese Patent Application Laid-open No. 2006-72288). In the optical scanning device disclosed in Japanese Patent Application Laid-open No. 2006-72288, an optical surface that does not have a curvature in the sub-scanning direction but has an eccentric tilting in the sub-scanning direction changed toward a main scanning direction is disposed between another optical surface that is most refractive in the sub-scanning direction and the light deflector, thereby enabling to correct the wave aberration. Furthermore, the bending of the scanning line can also be corrected by providing a scanning lens with a surface which is similar to the optical surface described above on a scanned side thereof. As a result, the degradation in the optical properties specific to the obliquely incident optical system can be corrected, and a cost reduction and miniaturization are achieved compared to the prior art.

Japanese Patent Application Laid-open No. 2008-15139 discloses an optical scanning device configured by an image-forming optical element that includes a plurality of optical effective portions, and one or more optical non-effective portions that does not allow the light beam to pass therethrough and that are provided between the plurality of optical effective portions such that a distance in an optical axis direction from a line segment connecting each apex of the plurality of optical effective portions to a apex of the optical non-effective portion in a sub-scanning cross-section is smaller than or equal to 1.0 mm.

Generally, a scanning lens molded by resin injection to a mold having a cavity of a shape similar to the scanning lens is used from the viewpoint of the manufacturing cost and the precision control in forming a shape of an optical surface.

In recent years, there is a need for further reducing a price of an image forming apparatus and achieving higher image quality on an output image thereof, and accordingly, there is also a need for further reducing a price and improving scanning accuracy of an optical scanning device.

An attempt has been made to use a scanning lens having a shape in which a plurality of optical surfaces is disposed along the sub-scanning direction was used with the aim of reducing the number of components; however, with the image forming optical element disclosed in Japanese Patent Application Laid-open No. 2008-15139, the accuracy in the shape of an optical surface has been found insufficient and it has been found difficult to improve the scanning precision.

SUMMARY OF THE INVENTION

It is an object of the present invention to at least partially solve the problems in the conventional technology.

An optical scanning device that scans a plurality of surfaces to be scanned in a main scanning direction by using a light beam includes: a plurality of light sources; a light deflector that deflects a plurality of light beams emitted from the light sources; and a scanning optical system that individually guides each one of the light beams deflected by the light deflector to a corresponding one of the surfaces to be scanned.

The scanning optical system includes one scanning lens shared by the light beams, and at least one surface of the scanning lens has a plurality of optical surfaces corresponding to the plurality of light beams disposed in a sub-scanning direction with a flat surface provided between the optical surfaces.

An image forming apparatus includes: a plurality of image carriers; and the optical scanning device mentioned above for scanning the image carriers with a light beam modulated according to corresponding pieces of image information.

A scanning lens that is molded by resin injection includes: a plurality of optical surfaces on at least one of an incident side and an exit side. The optical surfaces are disposed in one direction with a flat surface provided between the optical surfaces.

A molding method used for molding a resin scanning lens that includes a plurality of optical surfaces on at least one of an incident side and an exit side includes: filling a cavity with a resin material using a mold that includes a mold member that is used for forming the cavity having a shape similar to that of the scanning lens and that includes a plurality of surfaces, which correspond to the optical surfaces, to be disposed in one direction with a flat surface provided between the optical surfaces.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is an explanatory diagram illustrating a scanning optical system A and a scanning optical system B;

DETAILED DESCRIPTION OF THE PREFERRED EMBODIMENTS

Figure 1:
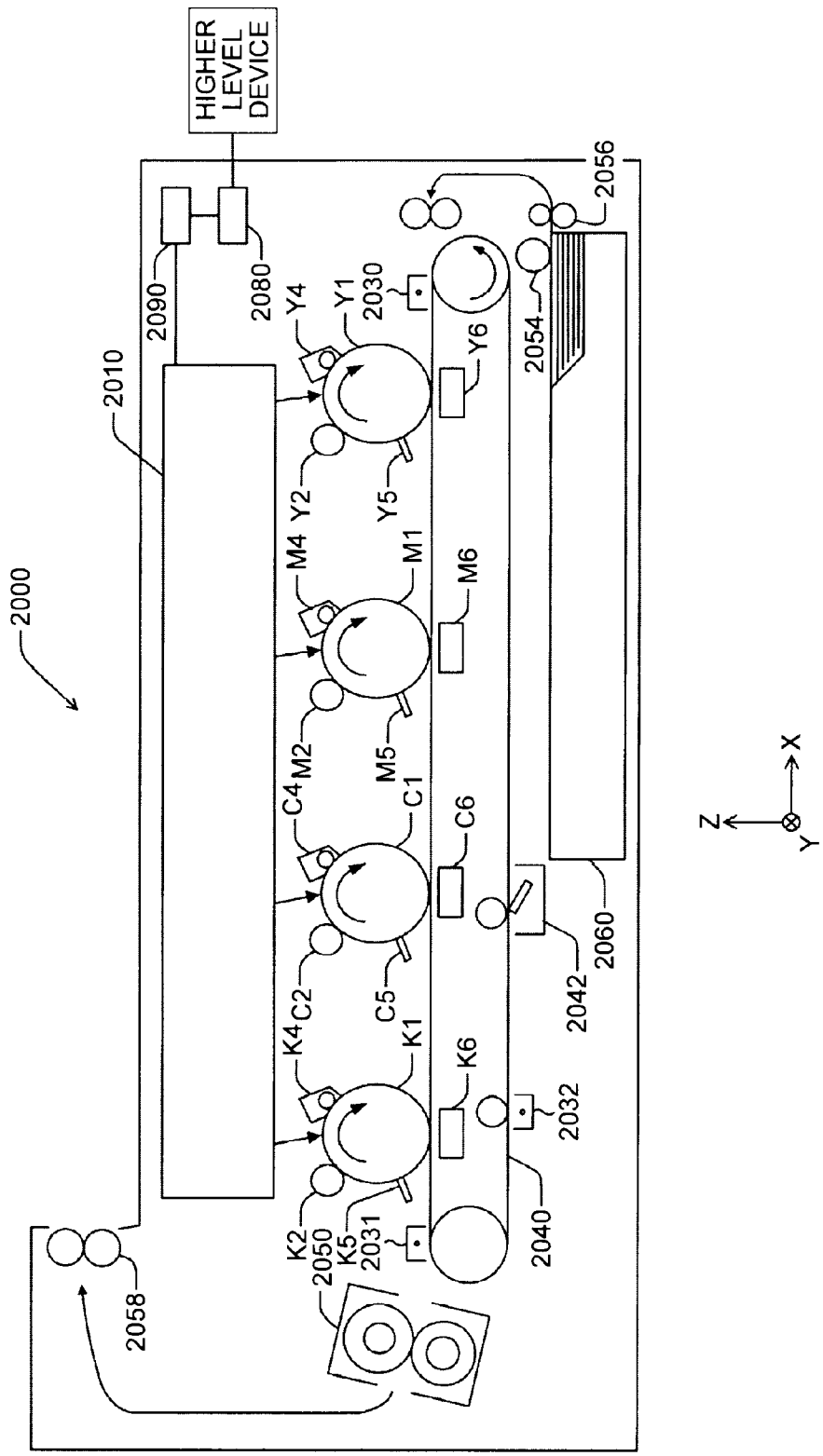
FIG. 1 is an explanatory diagram illustrating a schematic configuration of a color printer according to an embodiment.

An embodiment will be hereinafter described with reference to FIGS. 1 to 20. FIG. 1 illustrates a schematic configuration of a color printer 2000 according to the embodiment.

The color printer 2000 is a tandem-type color printer for forming a multi-color image by superimposing four colors (black, cyan, magenta, and yellow), and includes four photosensitive elements (K1, C1, M1, and Y1), four drum charging units (K2, C2, M2, and Y2), four developing units (K4, C4, M4, and Y4), four drum cleaning devices (K5, C5, M5, and Y5), four transfer units (K6, C6, M6, and Y6), an optical scanning device 2010, a belt charging unit 2030, a belt separating device 2031, a belt neutralization device 2032, a conveying belt 2040, a belt cleaning device 2042, a fixing device 2050, a paper feeding roller 2054, a registration roller pair 2056, a discharging roller 2058, a paper feed tray 2060, a communication control device 2080, and a printer control device 2090 for comprehensively controlling each unit listed above.

In the present specification, description will be made by taking the direction along the longitudinal direction of each of the photosensitive elements (K1, C1, M1, and Y1) as the Y-axis direction, and the direction along the arraying direction of the four photosensitive elements as the X-axis direction in a XYZ three-dimensional Cartesian coordinate system.

The communication control device 2080 controls the bi-directional communication with a higher-level device (for example, personal computer) via a network and the like.

The printer control device 2090 notifies the optical scanning device 2010 of the multi-color image information (black image information, cyan image information, magenta image information, and yellow image information) from the higher-level device received through the communication control device 2080.

The photosensitive element K1, the drum charging unit K2, the developing unit K4, the drum cleaning device K5, and the transfer unit K6 are used as a set to configure an image forming station for forming a black image (hereinafter also referred to as "K station" for the sake of convenience).

The photosensitive element C1, the drum charging unit C2, the developing unit C4, the drum cleaning device C5, and the transfer unit C6 are used as a set to configure an image forming station for forming a cyan image (hereinafter also referred to as "C station" for the sake of convenience).

The photosensitive element M1, the drum charging unit M2, the developing unit M4, the drum cleaning device M5, and the transfer unit M6 are used as a set to configure an image forming station for forming a magenta image (hereinafter also referred to as "M station" for the sake of convenience).

The photosensitive element Y1, the drum charging unit Y2, the developing unit Y4, the drum cleaning device Y5, and the transfer unit Y6 are used as a set to configure an image forming station for forming a yellow image (hereinafter also referred to as "Y station" for the sake of convenience).

A photosensitive layer is formed on a surface of each of the photosensitive elements (K1, C1, M1, and Y1). That is, the surface of each of the photosensitive elements (K1, C1, M1, and Y1) is a surface to be scanned. The photosensitive elements (K1, C1, M1, and Y1) are rotated in the direction of the respective arrows within a plane in FIG. 1 by a rotation mechanism (not illustrated).

Each of the drum charging units (K2, C2, M2, and Y2) uniformly charges the surface of the corresponding one of the photosensitive elements (K1, C1, M1, and Y1).

The optical scanning device 2010 irradiates a surface of the corresponding one of the charged photosensitive elements (K1, C1, M1, and Y1) with light beam modulated for each color based on the multi-color image information (black image information, magenta image information, cyan image information, and yellow image information) from the printer control device 2090. Thus, on the surface of each one of the photosensitive elements (K1, C1, M1, and Y1), only a portion irradiated with the light loses charge, and a latent image corresponding to the image information is formed on the surface of each one of the photosensitive elements (K1, C1, M1, and Y1). The latent image formed here moves toward the corresponding one of the developing units (K4, C4, M4, and Y4) with the rotation of the corresponding one of the photosensitive elements (K1, C1, M1, and Y1). The configuration of the optical scanning device 2010 will be described later.

The developing unit K4 causes a black toner to adhere to the latent image formed on the surface of the photosensitive element K1 so as to make the latent image visible.

The developing unit C4 causes a cyan toner to adhere to the latent image formed on the surface of the photosensitive element C1 so as to make the latent image visible.

The developing unit M4 causes a magenta toner to adhere to the latent image formed on the surface of the photosensitive element M1 so as to make the latent image visible.

The developing unit Y4 causes a yellow toner to adhere to the latent image formed on the surface of the photosensitive element Y1 so as to make the latent image visible.

The image (hereinafter referred to as "toner image" for the sake of convenience), onto which the toner is caused to adhere by each one of the developing units (K4, C4, M4, and Y4), moves toward the corresponding one of the transfer units (K6, C6, M6, Y6) with the rotation of the corresponding one of the photosensitive elements (K1, C1, M1, and Y1).

The paper feed tray 2060 houses a recording sheet. The paper feeding roller 2054 is disposed in the vicinity of the paper feed tray 2060, and the paper feeding roller 2054 picks up the recording sheet from the paper feed tray 2060 one by one and conveys the recording sheet to the registration roller pair 2056. The registration roller pair 2056 conveys the recording sheet to the conveying belt 2040 at predetermined timing.

Each one of the toner images of yellow, magenta, cyan, and black is sequentially transferred onto the recording sheet on the conveying belt 2040 by the corresponding one of the transfer units (K6, C6, M6, Y6) in a superimposed manner, thereby to form a color image. The recording sheet onto which each toner image is transferred is conveyed to the fixing device 2050.

In the fixing device 2050, heat and pressure are applied to the recording sheet, whereby each toner image is fixed onto the recording sheet. The recording sheet is conveyed to a discharge tray via the discharging roller 2058, and sequentially stacked on the discharge tray.

Each one of the drum cleaning devices (K5, C5, M5, and Y5) removes the toner (residual toner) remaining on the surface of the corresponding one of the photosensitive elements (K1, C1, M1, and Y1). A surface of each one of the photosensitive elements (K1, C1, M1, and Y1) from which the residual toner is removed returns to a position facing the corresponding one of the charging units (K2, C2, M2, and Y2).

The belt charging unit 2030 charges a surface of the conveying belt 2040. The recording sheet is thereby electrostatically adsorbed on the surface of the conveying belt 2040.

The belt separating device 2031 releases the adsorption of the recording sheet electrostatically adsorbed on the conveying belt 2040.

The belt neutralization device 2032 neutralizes the surface of the conveying belt 2040.

The belt cleaning device 2042 removes foreign substances adhering to the surface of the conveying belt 2040.

The configuration of the optical scanning device 2010 will now be described.

Figure 2:
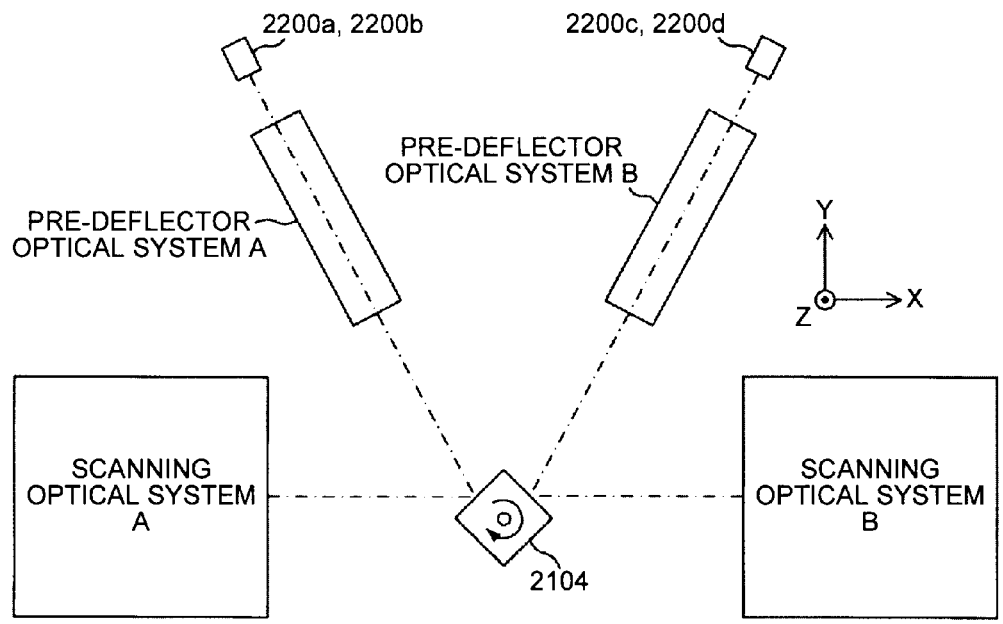
FIG. 2 is an explanatory diagram illustrating a schematic configuration of an optical scanning device.

As illustrated in FIG. 2 by way of example, the optical scanning device 2010 includes four light sources (2200a, 2200b, 2200c, 2200d), a pre-deflector optical system A, a pre-deflector optical system B, a polygon mirror 2104, a scanning optical system A, a scanning optical system B, and a scanning control device (not illustrated).

In the following description, for the sake of convenience, the direction corresponding to the main scanning direction is briefly described as "main scanning corresponding direction", and the direction corresponding to the sub-scanning direction is briefly described as the "sub-scanning corresponding direction".

Each light source includes a semiconductor laser diode (LD) or a vertical cavity surface emitting laser (VCSEL) having 659 nm of emission wavelength.

Figure 3:
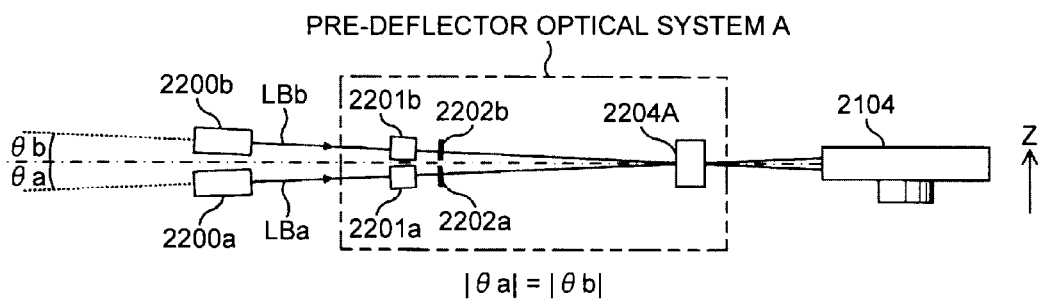
FIG. 3 is an explanatory diagram illustrating a pre-deflector optical system A.

As illustrated in FIG. 3 by way of example, the pre-deflector optical system A includes two coupling lenses (2201a, 2201b), two opening plates (2202a, 2202b), and a cylindrical lens 2204A.

The coupling lens 2201a is disposed on an optical path of a light beam LBa emitted from the light source 2200a and converts the light beam LBa to a substantially parallel light beam. The coupling lens 2201b is disposed on an optical path of a light beam LBb emitted from the light source 2200b and converts the light beam LBb to a substantially parallel light beam.

The opening plate 2202a has an opening, and shapes the light beam LBa passing through the coupling lens 2201a. The opening plate 2202b has an opening, and shapes the light beam LBb passing through the coupling lens 2201b.

The cylindrical lens 2204A causes the light beam LBa passing through the opening of the opening plate 2202a and the light beam LBb passing through the opening of the opening plate 2202b to form an image with respect to the Z-axis direction in the vicinity of the deflecting reflective surface of the polygon mirror 2104.

Figure 4:
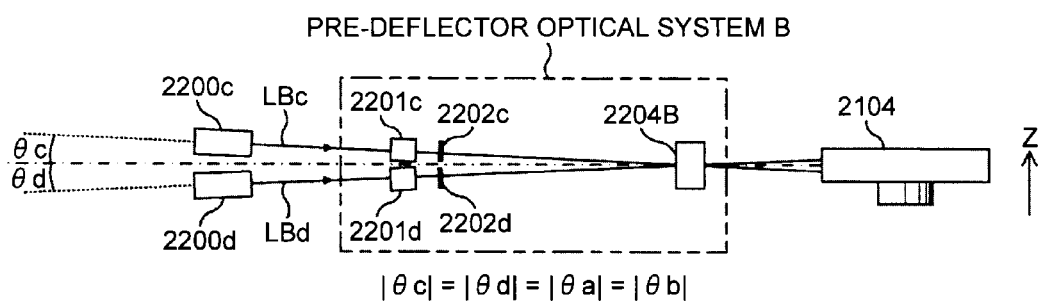
FIG. 4 is an explanatory diagram illustrating a pre-deflector optical system B.

As illustrated in FIG. 4 by way of example, the pre-deflector optical system B includes two coupling lenses (2201c, 2201d), two opening plates (2202c, 2202d), and a cylindrical lens 2204B.

The coupling lens 2201c is disposed on an optical path of a light beam LBc emitted from the light source 2200c and converts the light beam LBc into a substantially parallel light beam. The coupling lens 2201d is disposed on an optical path of a light beam LBd emitted from the light source 2200d and converts the light beam LBd into a substantially parallel light beam.

The opening plate 2202c has an opening, and shapes the light beam LBc passing through the coupling lens 2201c. The opening plate 2202d has an opening, and shapes the light beam LBd passing through the coupling lens 2201d.

The cylindrical lens 2204B causes the light beam LBc passing through the opening of the opening plate 2202c and the light beam LBd passing through the opening of the opening plate 2202d to form an image with respect to the Z-axis direction in the vicinity of the deflecting reflective surface of the polygon mirror 2104.

The polygon mirror 2104 has a four-sided mirror, of which each mirror serves as the deflecting reflective surface. The four-sided mirror rotates at a constant angular velocity about a center axis parallel to the Z axis, and deflects the incident light beam while rotating at the constant angular velocity.

The light beam LBa and the light beam LBb from the cylindrical lens 2204A are incident on the same deflecting reflective surface disposed on the −X side (the negative side in the X-axis direction) of the polygon mirror 2104.

The light beam LBa is set to be incident on the deflecting reflective surface from the direction tilted by an angle θa toward the −Z side (the negative side in the Z-axis direction) with respect to the XY plane, and the light beam LBb is set to be incident on the deflecting reflective surface from the direction tilted by an angle θb toward the +Z side (the positive side in the Z-axis direction) with respect to the XY plane.

The light beam LBc and the light beam LBd from the cylindrical lens 2204B are incident on the same deflecting reflective surface disposed on the +X side (the positive side in the X-axis direction) of the polygon mirror 2104.

Each one of the cylindrical lenses 2204A and 2204B is disposed at a position where the two light beams (the light beam LBa and the light beam LBb, or the light beam LBc and the light beam LBd) intersect with each other with respect to the Z-axis direction. Two light beams do not necessarily intersect with each other. Instead, it is sufficient if the two light beams appear to intersect with each other when viewed from a direction perpendicular to the Z-axis direction.

The light beam LBc is set to be incident on the deflecting reflective surface from the direction tilted by an angle θc toward the +Z side with respect to the XY plane, and the light beam LBd is set to be incident on the deflecting reflective surface from the direction tilted by an angle θd toward the −Z side with respect to the XY plane.

In the followings, when the light beam is incident on the deflecting reflective surface, the incidence from a direction tilted with respect to a plane perpendicular to a rotation axis of the polygon mirror 2104 (here, the XY plane) is referred to as "oblique incidence," and the incidence from a direction parallel to the plane perpendicular to the rotation axis is referred to as "horizontal incidence".

Figure 5:
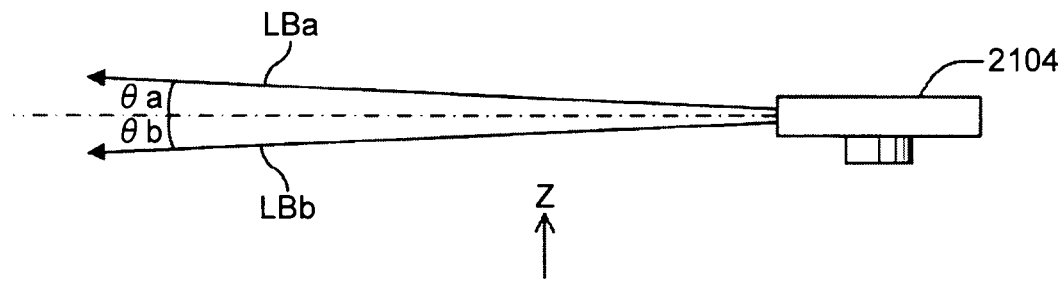
FIG. 5 is an explanatory diagram illustrating optical paths of two light beams (LBa, LBb) deflected by a deflecting reflective surface of a polygon mirror.

As illustrated in FIG. 5 by way of example, the light beam LBa that is incident on the deflecting reflective surface is reflected in the direction tilted by an angle θa toward the +Z side with respect to a plane perpendicular to the rotation axis of the polygon mirror 2104, and the light beam LBb that is incident on the deflecting reflective surface is reflected in the direction tilted by an angle θb toward the −Z side with respect to a plane perpendicular to the rotation axis of the polygon mirror 2104.

Figure 6:
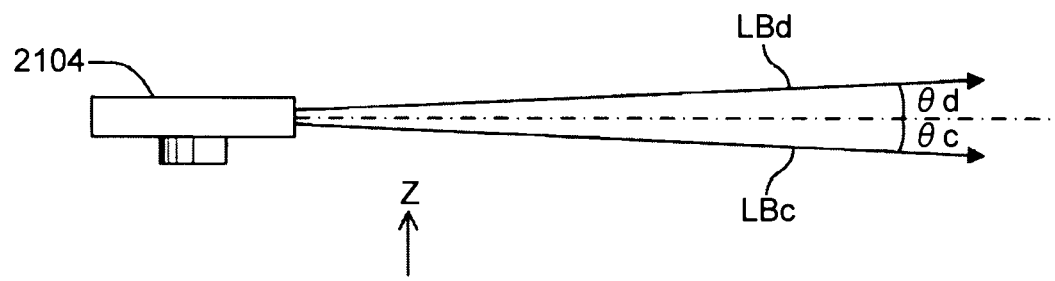
FIG. 6 is an explanatory diagram illustrating optical paths of two light beams (LBc, LBd) deflected by the deflecting reflective surface of the polygon mirror.
Figure 7:
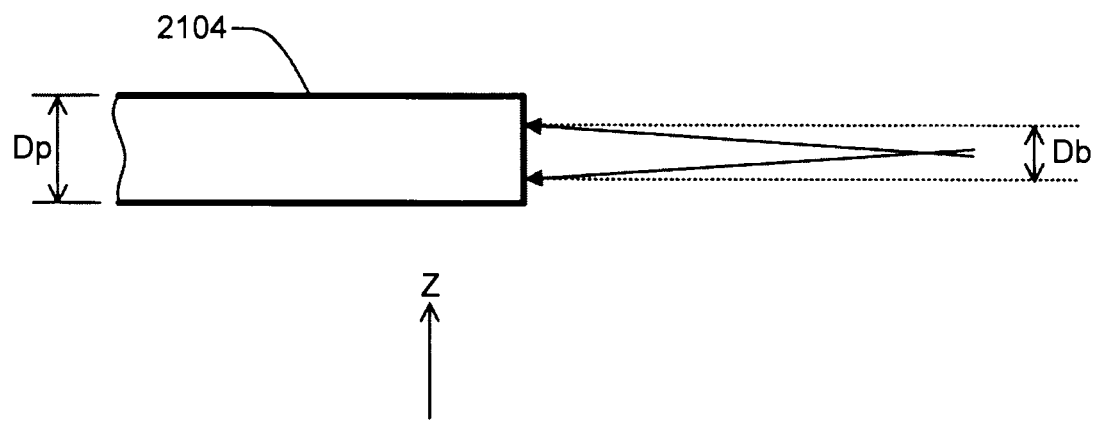
FIG. 7 is an explanatory diagram illustrating incident positions of two light beams incident on the same deflecting reflective surface.

As illustrated in FIG. 6 by way of example, the light beam LBc that is incident on the deflecting reflective surface is reflected in the direction tilted by an angle θc toward the −Z side with respect to a plane perpendicular to the rotation axis of the polygon mirror 2104, and the light beam LBd that is incident on the deflecting reflective surface is reflected in the direction tilted by an angle θd toward the +Z side with respect to a plane perpendicular to the rotation axis of the polygon mirror 2104.

Here, it is set that $|\theta a|=|\theta b|=|\theta c|=|\theta d|=1°$.

The length (Dp in FIG. 7, hereinafter also referred to as "thickness of deflecting reflective surface") of the deflecting reflective surface of the polygon mirror 2104 along the rotation axis direction is about 4 mm. Incident positions on the deflecting reflective surface of the two light beams incident on the same deflecting reflective surface are separated from each other on the deflecting reflective surface by about 2.5 mm (Db in FIG. 7) along the rotation axis direction of the polygon mirror 2104.

As illustrated in FIG. 8 by way of example, the scanning optical system A is disposed on the −X side of the polygon mirror 2104, and includes a scanning lens 2105A, and three bending mirrors (2106a, 2106b, and 2108b).

The photosensitive element K1 is irradiated with the light beam LBa that has been deflected by the polygon mirror 2104, has passed through the scanning lens 2105A, and has been bent by the bending mirror 2106a.

The photosensitive element C1 is irradiated with the light beam LBb that has been deflected by the polygon mirror 2104, has passed through the scanning lens 2105A, and has been bent by the bending mirror 2106b and the bending mirror 2108b.

As illustrated in FIG. 8 by way of example, the scanning optical system B is disposed on the +X side of the polygon mirror 2104, and includes a scanning lens 2105B, and three bending mirrors (2106c, 2106d, and 2108c).

The photosensitive element M1 is irradiated with the light beam LBc that has been deflected by the polygon mirror 2104, has passed through the scanning lens 2105B, and has been bent by the bending mirror 2106c and the bending mirror 2108c.

The photosensitive element Y1 is irradiated with the light beam LBd that has been deflected by the polygon mirror 2104, has passed through the scanning lens 2105B, and has been bent by the bending mirror 2106d.

A light spot on each of the photosensitive elements (K1, C1, M1, and Y1) moves in the longitudinal direction of each of the photosensitive elements (K1, C1, M1, and Y1) associated with the rotation of the polygon mirror 2104. The moving direction of the light spot at each of the photosensitive elements (K1, C1, M1, and Y1) is the "main scanning direction", and the rotating direction of each of the photosensitive elements (K1, C1, M1, and Y1) is the "sub-scanning direction".

In the present embodiment, one scanning lens is shared by two stations; therefore the spacing between the two light beams with respect to the sub-scanning corresponding direction can be made small compared with the case where the two scanning lenses are disposed by being stacked on each other in the sub-scanning corresponding direction (here, same as the Z-axis direction) according to the prior art. Furthermore, the number of components is reduced, and therefore, it is possible to reduce a cost for manufacturing parts, to improve efficiency in parts management, and to reduce a cost for the parts management.

Figure 9A:
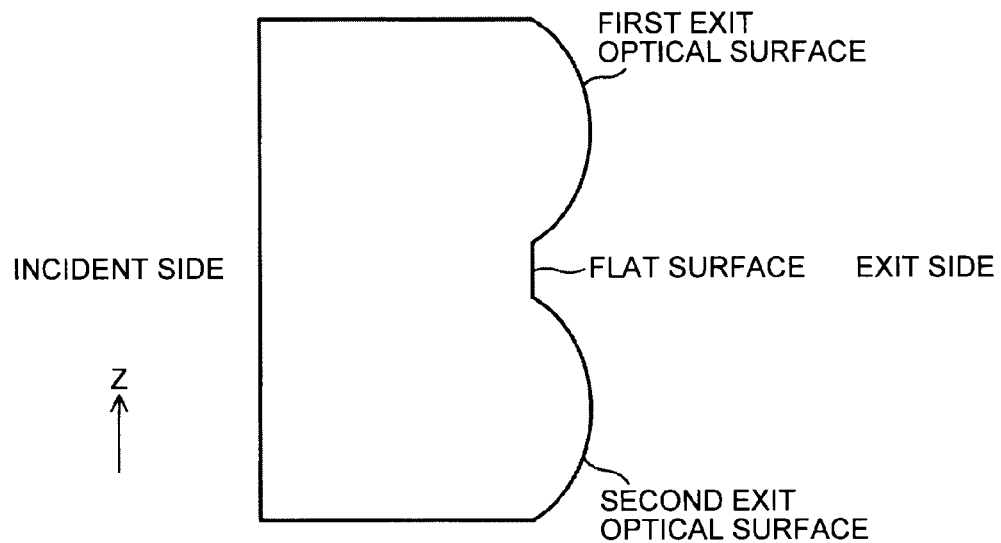
FIGS. 9A and 9B are diagrams respectively illustrating a scanning lens.
Figure 9B:
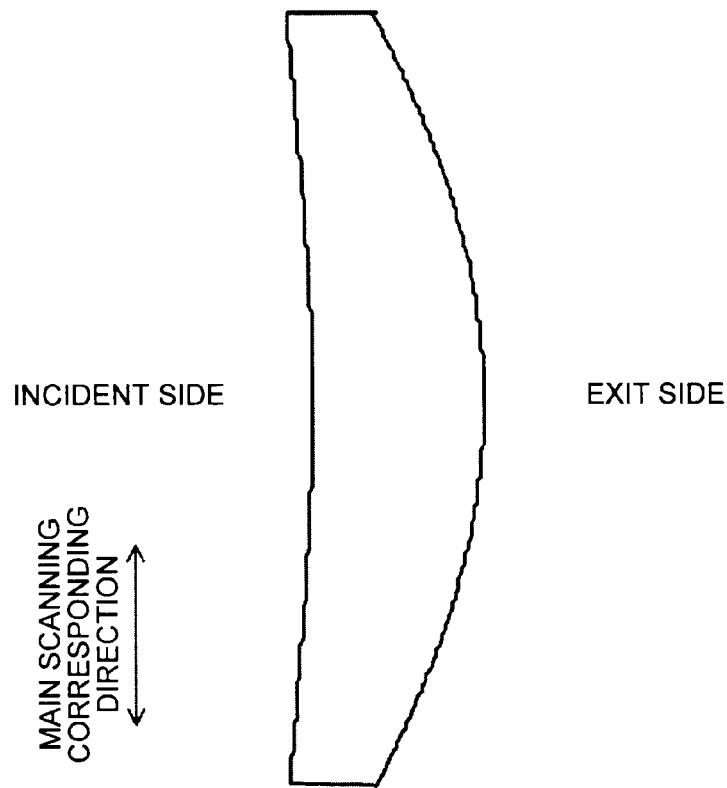

Each one of the scanning lenses 2105A and 2105B is made of resin, and includes two optical surfaces disposed in the sub-scanning corresponding direction (here, same as the Z-axis direction) on the exit side, as illustrated in FIG. 9A by way of example. Here, the optical surface on the +Z side of the two optical surfaces on the exit side is a first exit optical surface, and the optical surface on the −Z side is a second exit optical surface. A flat surface is provided between the first exit optical surface and the second exit optical surface. FIG. 9B is a diagram illustrating a plan view of each one of the scanning lenses 2105A and 2105B.

Figure 10:
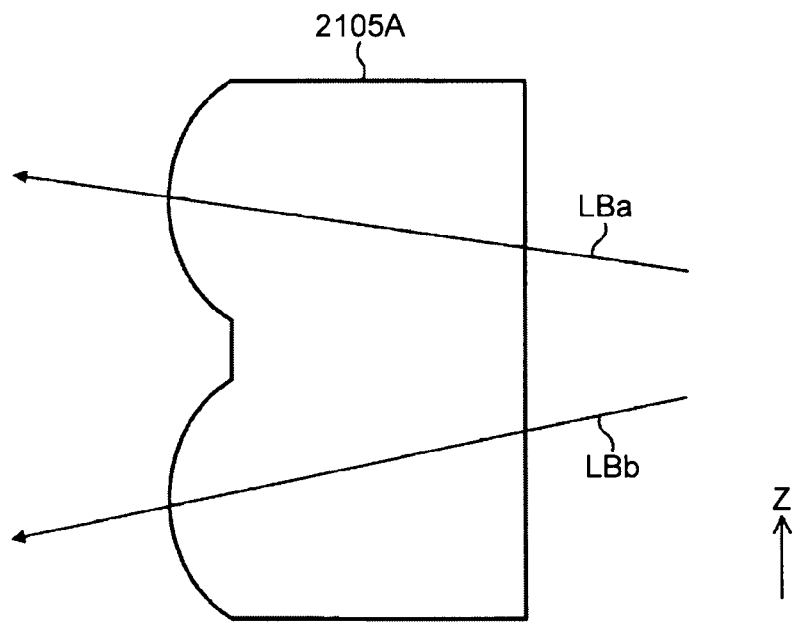
FIG. 10 is an explanatory diagram illustrating a relation between two optical surfaces and two light beams (LBa, LBb) of a scanning lens 2105A.

The first exit optical surface of the scanning lens 2105A is an optical surface through which the light beam LBa passes, and the second exit optical surface is an optical surface through which the light beam LBb passes (see FIG. 10).

Figure 11:
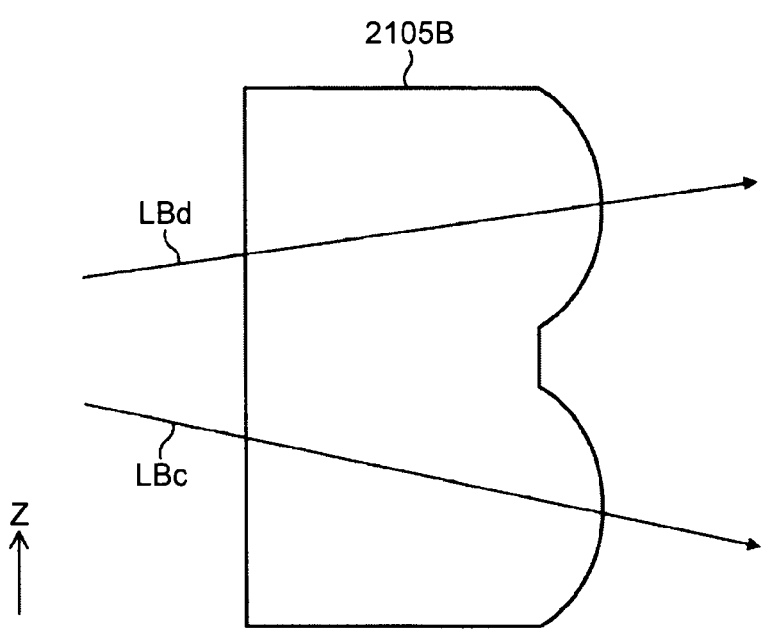
FIG. 11 is an explanatory diagram illustrating a relation between two optical surfaces and two light beams (LBc, LBd) of a scanning lens 2105B.

The first exit optical surface of the scanning lens 2105B is an optical surface through which the light beam LBd passes, and the second exit optical surface thereof is an optical surface through which the light beam LBc passes (see FIG. 11). In the following description, the scanning lens 2105A and the scanning lens 2105B are collectively referred to as "scanning lens 2105" when there is no need of distinction therebetween.

Figure 12:
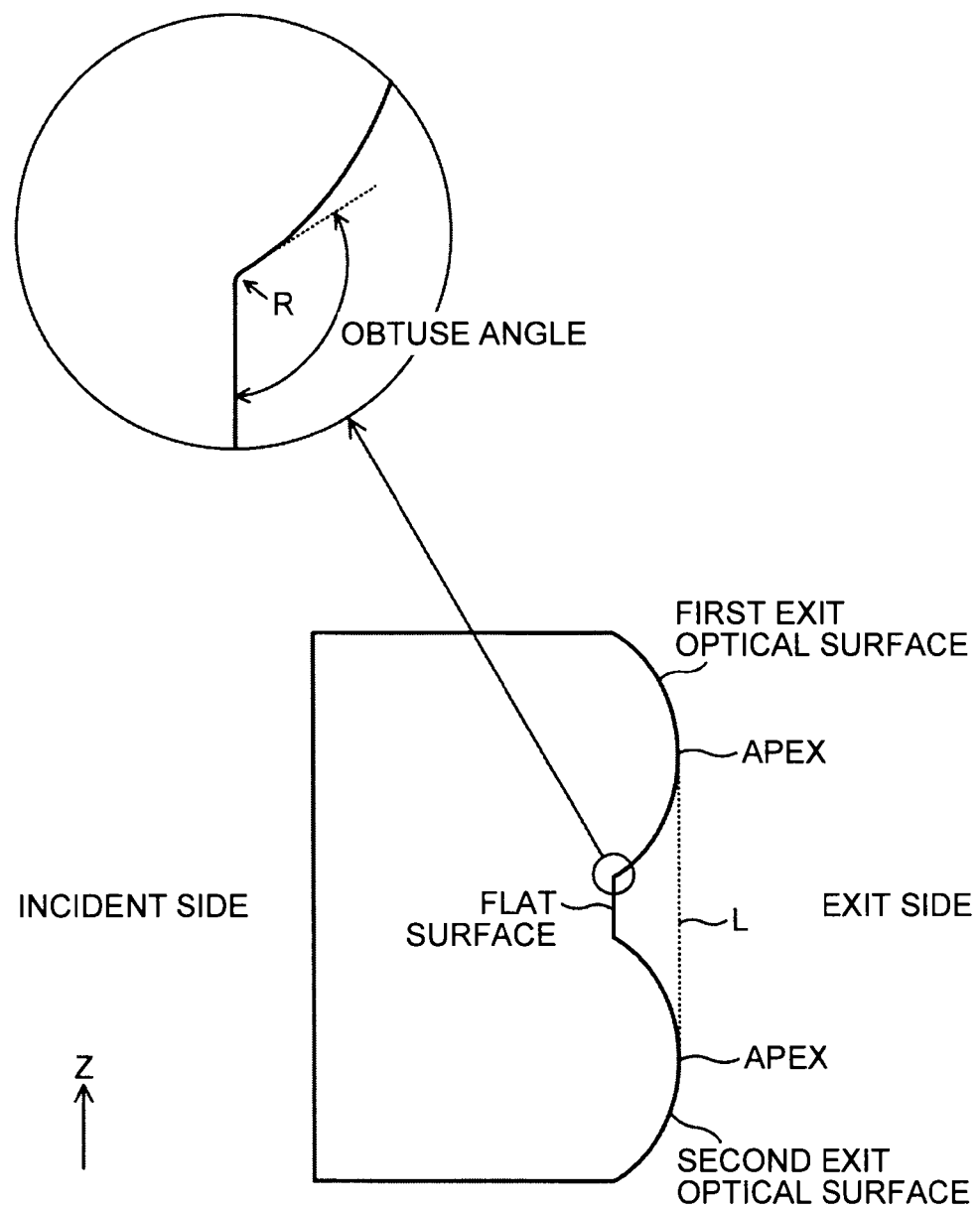
FIG. 12 is an explanatory diagram illustrating a relation between a flat surface on the scanning lens and a line segment L.

The flat surface between the first exit optical surface and the second exit optical surface of the scanning lens 2105 is substantially parallel to a line segment L which connects the apex of the first exit optical surface and the apex of the second exit optical surface, as illustrated in FIG. 12 by way of example.

Figure 13:
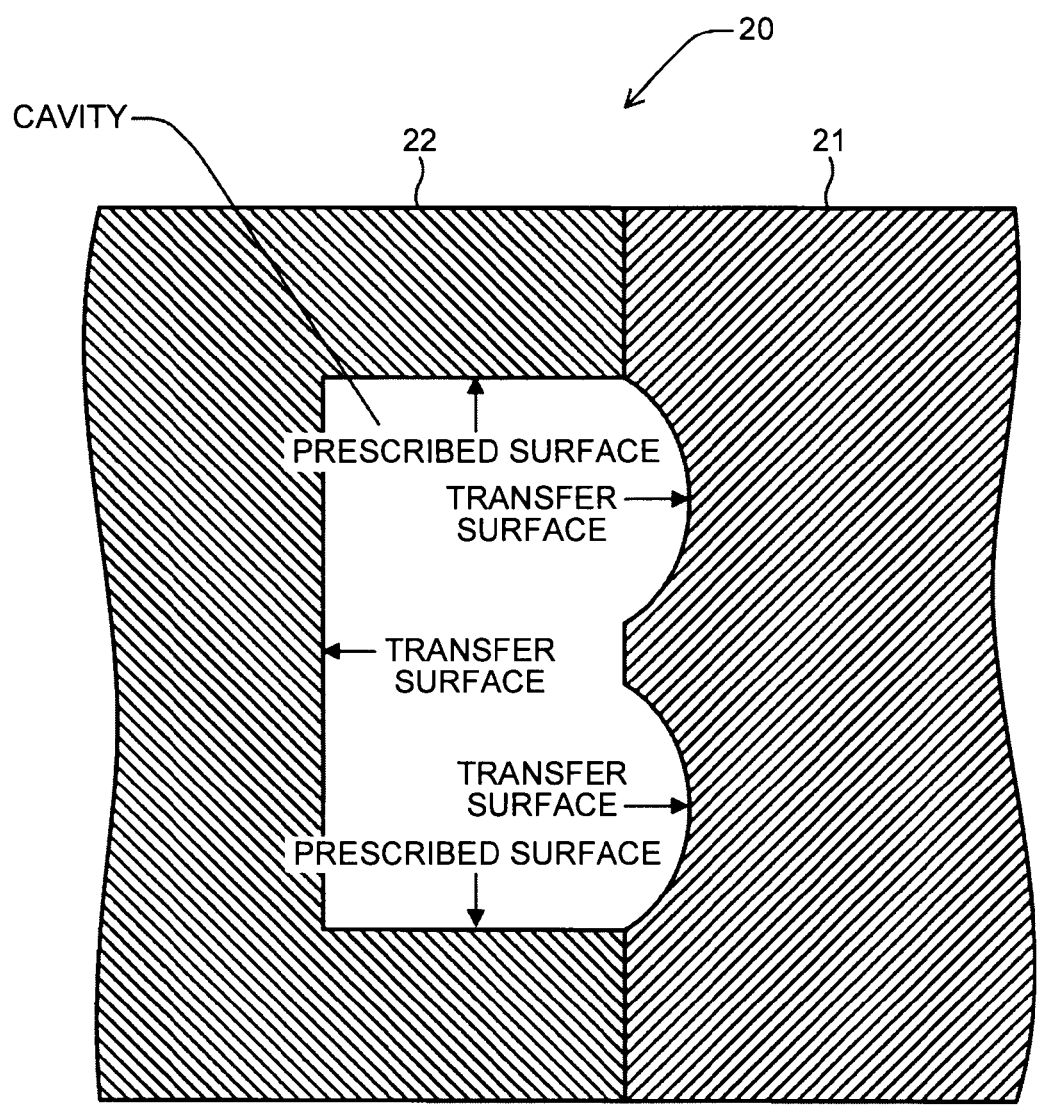
FIG. 13 is an explanatory diagram illustrating a mold 20 used to mold each scanning lens by injection molding.

FIG. 13 illustrates a mold 20 for molding used to mold the scanning lens 2105. The mold 20 has a cavity inside thereof with a shape similar to the shape of the scanning lens 2105.

The mold 20 has two members (21, 22). The member 21 includes a transfer surface for transferring the shape of the first exit optical surface and the shape of the second exit optical surface of the scanning lens 2105 to resin, and is also called a molding piece. The member 22 includes a transfer surface for transferring the shape of the optical surface on the incident side of the scanning lens 2105 onto resin, and a plurality of prescribed surfaces for ruling the size of the scanning lens 2105 in the sub-scanning corresponding direction.

Figure 14:
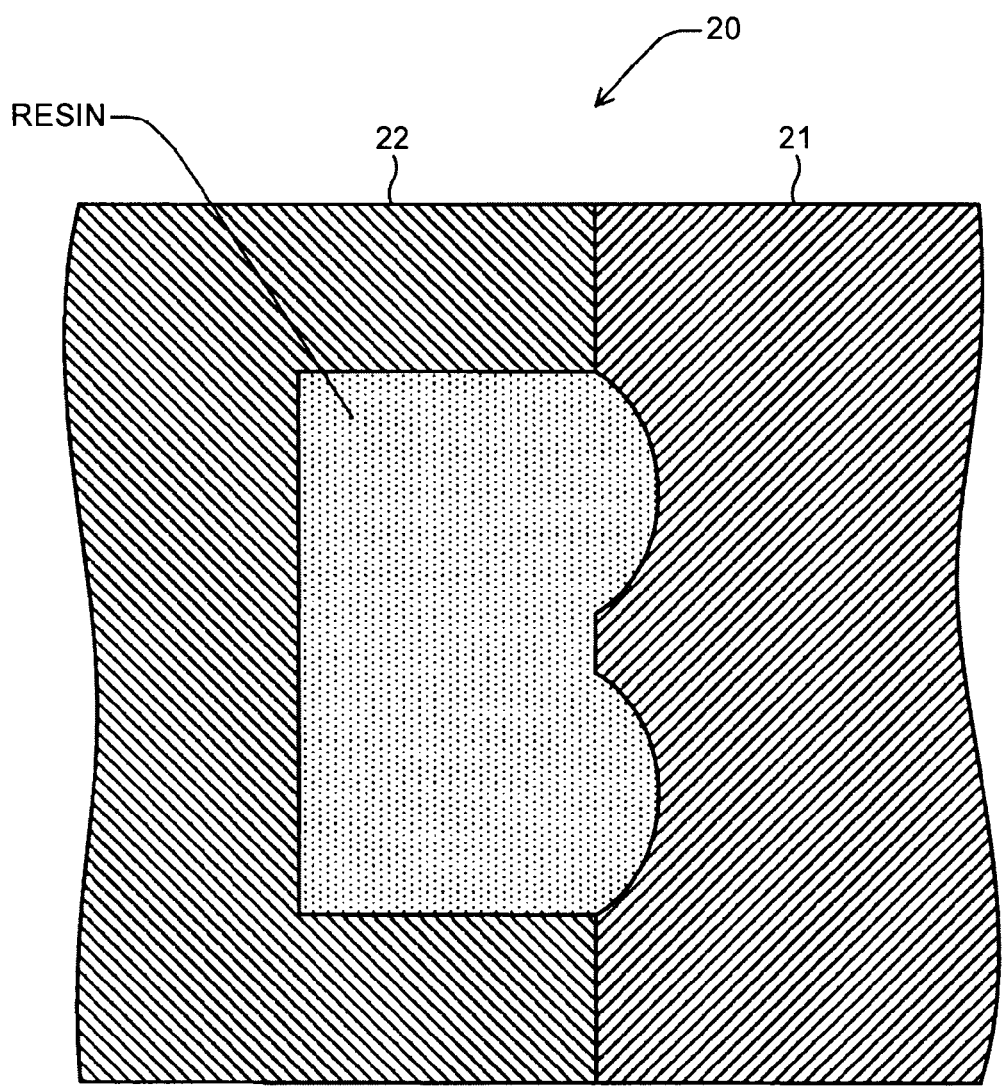
FIG. 14 is an explanatory diagram illustrating a state in which a cavity of the mold 20 is filled with resin.

FIG. 14 illustrates a state in which the cavity of the mold 20 is filled with the resin heated and melted, so that the temperature thereof becomes equal to or higher than a glass transition temperature (Tg). This resin is cooled via the mold 20.

Figure 15:
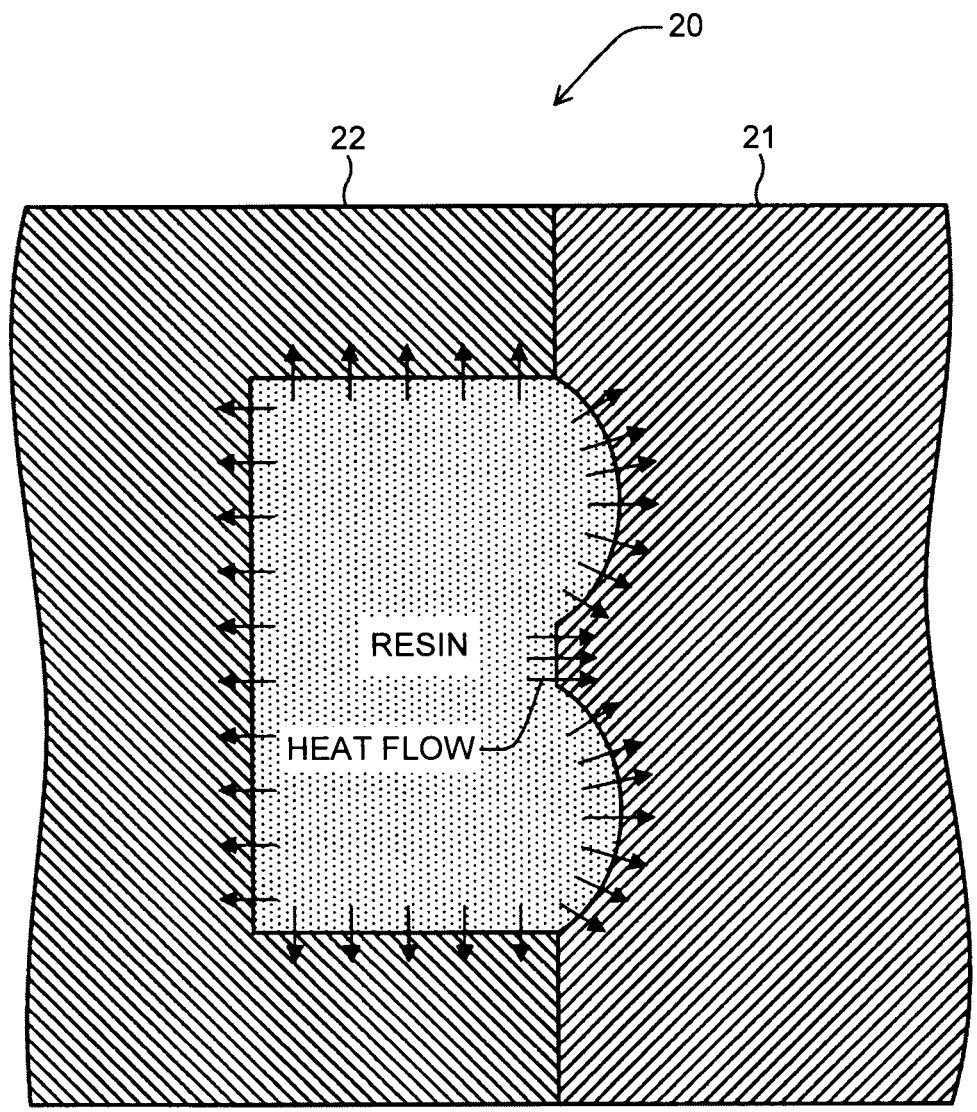
FIG. 15 is an explanatory diagram illustrating a heat flow when the resin in the mold 20 is cooled.

As illustrated in FIG. 15 by way of example, because the heat from the resin flows substantially uniformly into the mold 20 and discharged to the atmosphere, the resin in the cavity shrinks in a substantially isotropic manner. The resin is taken out of the mold 20 when the temperature of the resin becomes substantially equal to the temperature of the mold 20.

Figure 16:
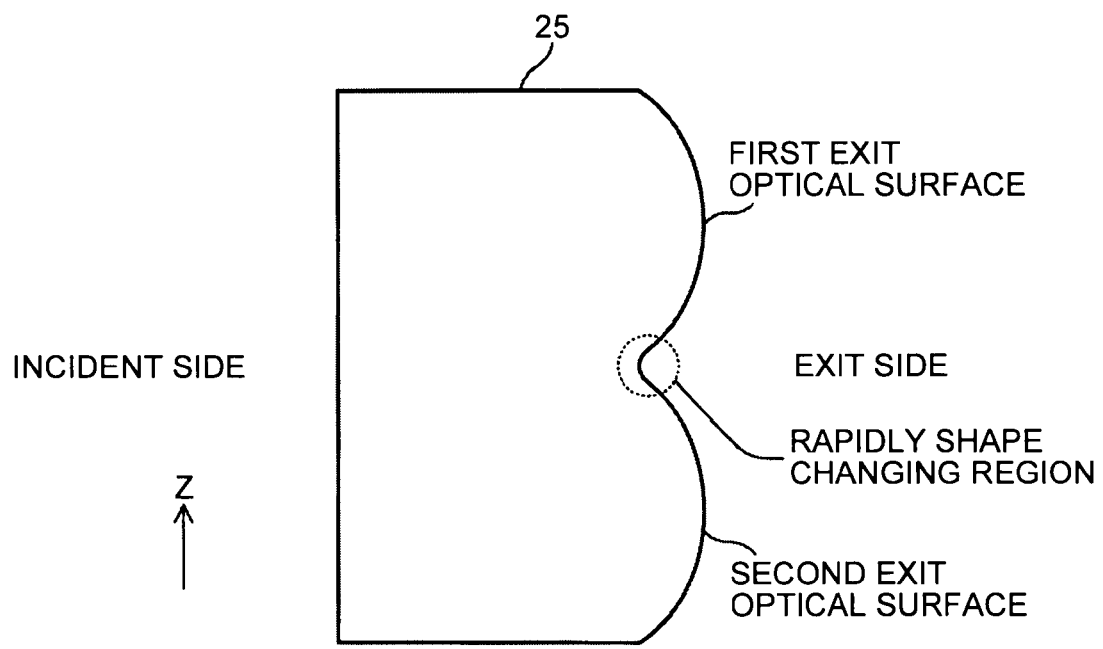
FIG. 16 is an explanatory diagram illustrating a scanning lens 25 according to a comparative example.
Figure 17:
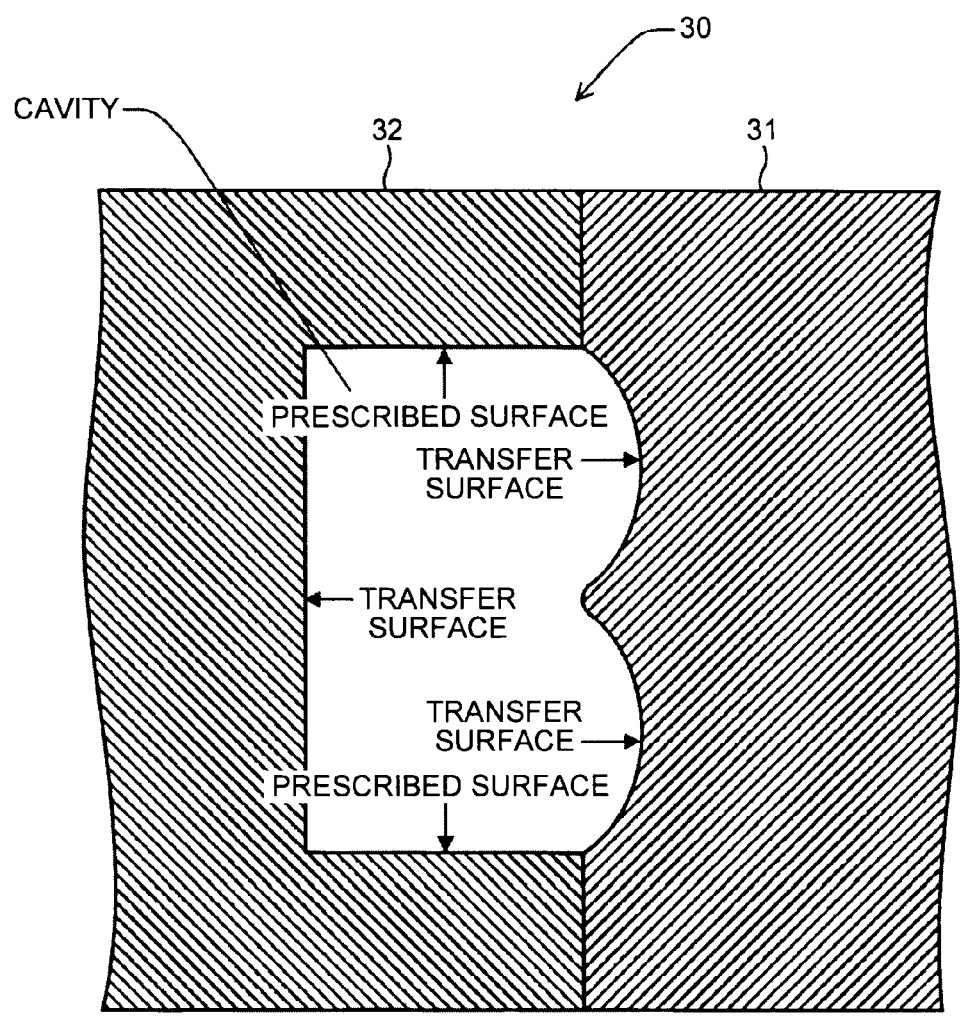
FIG. 17 is an explanatory diagram illustrating a molding mold 30 used to mold the scanning lens 25 by injection molding.

FIG. 16 illustrates the scanning lens 25 in which the flat surface is not provided between the first exit optical surface and the second exit optical surface, as a comparative example. In this case, the shape rapidly changes between the first exit optical surface and the second exit optical surface. A mold 30 for molding used to mold the scanning lens 25 is illustrated in FIG. 17. The mold 30 has two members (31, 32) and has a cavity inside thereof with a shape similar to the shape of the scanning lens 25.

Figure 18:
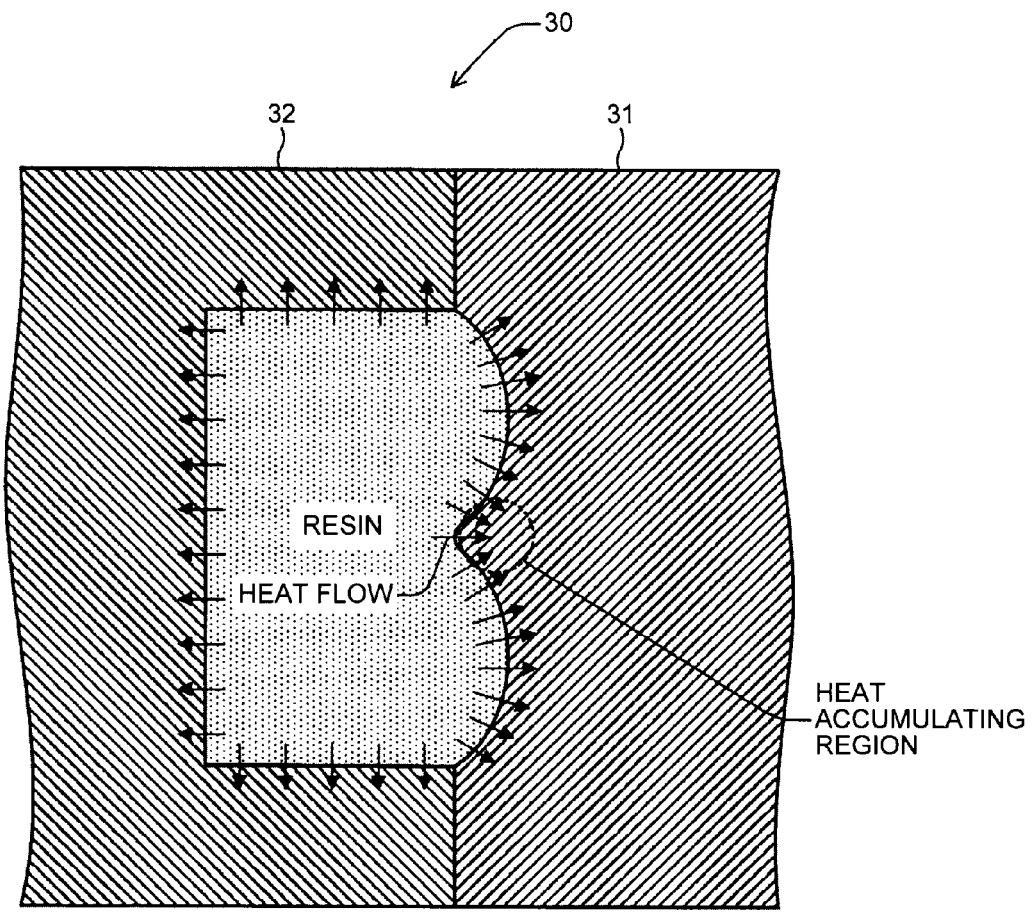
FIG. 18 is an explanatory diagram illustrating a heat flow when the resin in the mold 30 is cooled.
Figure 19:
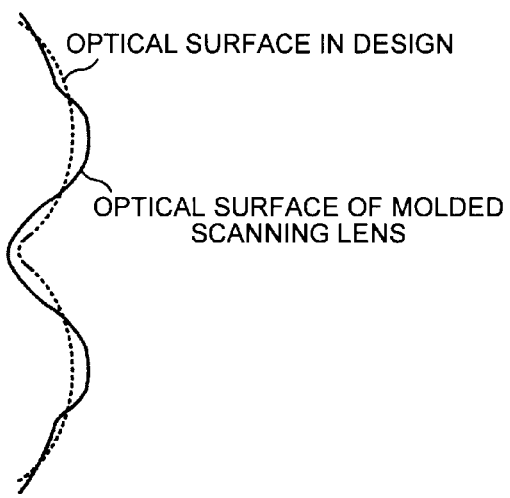
FIG. 19 is an explanatory diagram illustrating an undulation of an optical surface on the scanning lens 25.

In this case, as illustrated in FIG. 18 by way of example, the heat from the resin is accumulated in a region including an area between the transfer surface with the shape of the first exit optical surface and the transfer surface with the shape of the second exit optical surface so that the temperature in the region becomes higher than other regions in the member 31. Thus, the cooling of the resin is partially delayed near the region, and the resin in the cavity is not shrunk in an isotropic manner. As a result, the scanning lens to be molded produces undulation of the optical surface and the form accuracy of the optical surface is degraded, as illustrated in FIG. 19 by way of example. In FIG. 19, the undulation is illustrated in an exaggerated manner to facilitate the understanding.

In the scanning lens 25, because a recess between the first exit optical surface and the second exit optical surface is deep, the resistance (mold separation resistance) at the time of separating the recess from the member 31 (molding piece) becomes greater than the mold separation resistance on the first and second optical surfaces. A molded article molded with the mold 30 has an uneven mold separation resistance, which may cause deformation in the mold separation. An attempt may be made on making the depth of the recess between the first exit optical surface and the second exit optical surface shallower; however, in such a case, if the first exit optical surface and the second exit optical surface are connected by a curved surface so that the tilted angle between the two optical surfaces changes continuously, the length of the recess in the sub-scanning corresponding direction becomes long, thereby to increase the size of the scanning lens.

In the optical scanning device using the scanning lens 25, the wave aberration becomes larger by passing through the scanning lens 25, and the diameter of the beam spot becomes larger on the surface to be scanned. Furthermore, a so-called out-of-focus occurs on the surface to be scanned because the curvature differs by the emitting position at the optical surface on the exit side of the scanning lens 25.

In contrast, the scanning lens 2105 molded by the mold 20 has an even mold separation resistance because a deep recess does not exist between the first exit optical surface and the second exit optical surface, and hence there is no possibility that deformation occurs in mold separation.

Because the surface on the cavity side of the member 21 can be made easily to be a mirror-finished surface, the adhesion of the resin becomes uniform and the occurrence of form error due to mold separation can be further reduced.

By designing the scanning lens 2105 such that a curvature is set at a boundary between the flat surface and the respective one of the first and second exit optical surfaces thereof, surface portions on the cavity side of the member 21 corresponding to the first and second exit optical surfaces of the scanning lens 2105 and a surface portion on the cavity side of the member 21 corresponding to the flat surface of the scanning lens 2105 can be continuously processed. That is, workability for manufacturing the member 21 is improved. Furthermore, by designing the scanning lens 2105 such that the flat surface thereof is smoothly connected with the first and second exit optical surfaces thereof at the corresponding boundaries, increase in the mold separation resistance at the boundaries between the flat surface and the first and second exit optical surfaces.

Therefore, although a resin-molded article, the scanning lens 2105 is excellent in form accuracy of the first exit optical surface and the second exit optical surface because the flat surface is provided between the optical surfaces. Thus, by using the optical scanning device 2010, a manufacturing cost can be reduced while maintaining high accuracy in an optical scanning process.

The flat surface of the scanning lens 2105 is subjected to processing after molding so that the reflectance becomes lower than each the first and second exit optical surfaces. Here, the flat surface is subjected to rough processing after the molding so as to be a rough surface. Thus, light can be prevented from being incident on the flat surface to become a ghost light that may be directed to the photosensitive elements (K1, C1, M1, and Y1).

Figure 20:
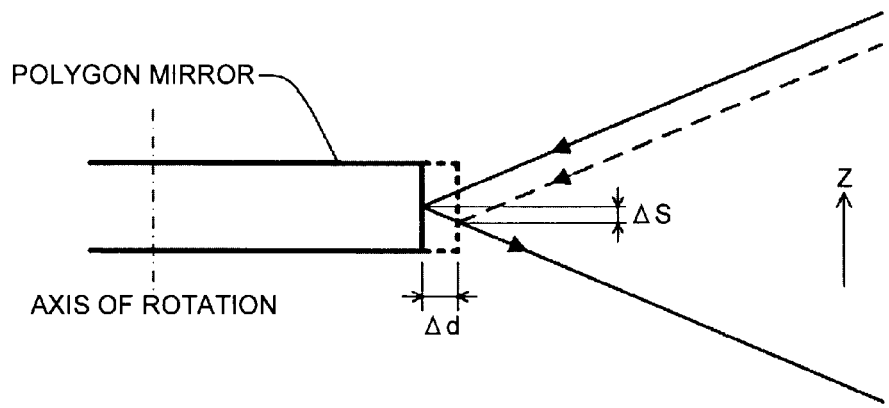
FIG. 20 is an explanatory diagram illustrating a relation between a variation in a distance from the axis of rotation of the polygon mirror 2104 to each one of the deflecting reflective surfaces and the oblique incidence.

As illustrated in FIG. 20 by way of example, if the distance from the axis of rotation of the polygon mirror 2104 to each one of the deflecting reflective surfaces varies ($\Delta d$ in FIG. 20), the reflecting position on the deflecting reflective surface changes ($\Delta S$ in FIG. 20) with respect to the Z-axis direction when the light beam is obliquely incident on the one of the deflecting reflective surfaces. If the reflecting position on the one of the deflecting reflective surfaces changes with respect to the Z-axis direction, an image forming position on the surface to be scanned changes in the sub-scanning direction. This causes a pitch fluctuation in the scanning lines on the surface to be scanned.

If there is the variation, the pitch fluctuation occurs in the scanning lines at every four lines for a polygon mirror having four deflecting reflective surfaces. The pitch fluctuation in the scanning lines is expressed as $\Delta S \times \beta$, where $\beta$ is a magnification of the scanning lens in the Z-axis direction. When the value of $\Delta S \times \beta$ becomes equal to or greater than 5 μm, the concentration in an output image becomes uneven, and the image quality is greatly degraded.

If the light beam is horizontally incident on the deflecting reflective surface, the reflecting position does not change in the Z-axis direction even if there is the variation, and hence the image forming position on the surface to be scanned does not change.

A first method for suppressing the degradation of the image quality includes increasing the distance between the scanning lens and the polygon mirror so as to reduce the magnification $\beta$. In this case, the length of the scanning lens in the Y-axis direction needs to be increased, causing an increase in the manufacturing cost of the scanning lens and an increase in the size of the optical scanning device. When reducing the magnification $\beta$ while keeping a field angle unchanged, the optical path length between the polygon mirror and a photosensitive element needs to be increased, causing an increase in the size of an image forming apparatus.

A second method for suppressing the degradation of the image quality includes reducing the oblique incident angle of the light beam. As the oblique incident angel becomes small, the shift $\Delta S$ of the reflecting position on the deflecting reflective surface in the Z-axis direction also becomes small.

In the present embodiment, one scanning lens 2105 having two optical surfaces disposed in the sub-scanning corresponding direction is used for the scanning lens, so that the oblique incident angle can be made small. If the oblique incident optical system of a related art is used, the oblique incident angle is often set to about 3 to 5°; however, in the present embodiment, the oblique incident angle can be set to about 1°.

As described above, the optical scanning device 2010 according to the present embodiment includes four light sources (2200*a*, 2200*b*, 2200*c*, and 2200*d*), the pre-deflector optical system A, the pre-deflector optical system B, the polygon mirror 2104, the scanning optical system A, the scanning optical system B, and the like.

Each scanning optical system includes one scanning lens 2105 and a plurality of bending mirrors. The scanning lens 2105 is shared by two stations, and is a resin-molded article having two optical surfaces each corresponding to each station on the exit surface side. The two optical surfaces are disposed along the sub-scanning corresponding direction with a flat surface provided between the optical surfaces.

In molding, the scanning lens 2105 uses a mold 20 that includes a mold member for forming a cavity of a shape similar to that of the scanning lens. The mold member includes two surfaces corresponding to the two optical surfaces of the scanning lens 2105 are disposed in one direction with a flat surface provided between the optical surfaces. Thus, a non-uniform shrinkage in the mold and deformation at the time of mold separation are suppressed in manufacturing the scanning lens 2105, so that the scanning lens 2105 is excellent in form accuracy of each optical surface despite that the scanning lens 2105 is a resin-molded article.

Accordingly, the optical scanning device 2010 can achieve a cost reduction and improvement in scanning accuracy.

In the meantime, the scanning lens including a plurality of optical surfaces normally has a larger volume compared to a scanning lens including only one optical surface, and thus a shrinking amount at the time of cooling becomes large and a molding sink tends to occur more easily. However, the scanning lens 2105 according to the present embodiment includes the flat surface between the two optical surfaces, so that each optical surface is capable of shrinking uniformly.

Each cylindrical lens is shared by two light beams. Thus, a spatial region (space) necessary for disposing the pre-deflector optical systems A and B can be reduced.

Because the four light beams incident on the polygon mirror 2104 are obliquely incident on the deflecting reflective surfaces thereof, the thickness of the deflecting reflective surfaces can be reduced, thereby to achieve a further cost reduction and miniaturization. Furthermore, a large energy is not required for rotating the deflecting reflective surfaces at high speed, and a "wind noise" generated when the deflecting reflective surfaces are rotated at high speed can be reduced.

The wave aberration by the oblique incidence can be reduced because the oblique incident angle can be made smaller compared to that in the prior art. Furthermore, when a plurality of toner images is superimposed, color shift can be reduced because the bending of scanning line on the surface of each of the photosensitive elements can be decreased.

Figure 21:
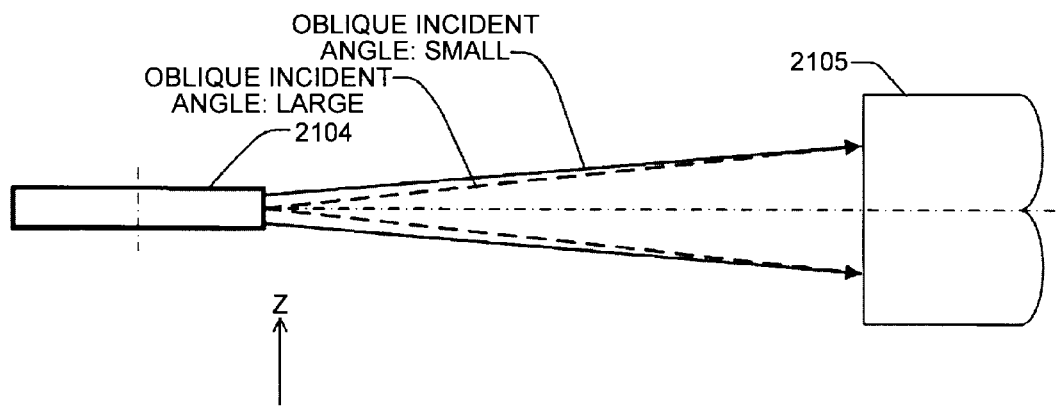
FIG. 21 is an explanatory diagram illustrating an effect of differing the incident positions of two light beams incident on the same deflecting reflective surface with respect to the sub-scanning corresponding direction.
Figure 22:
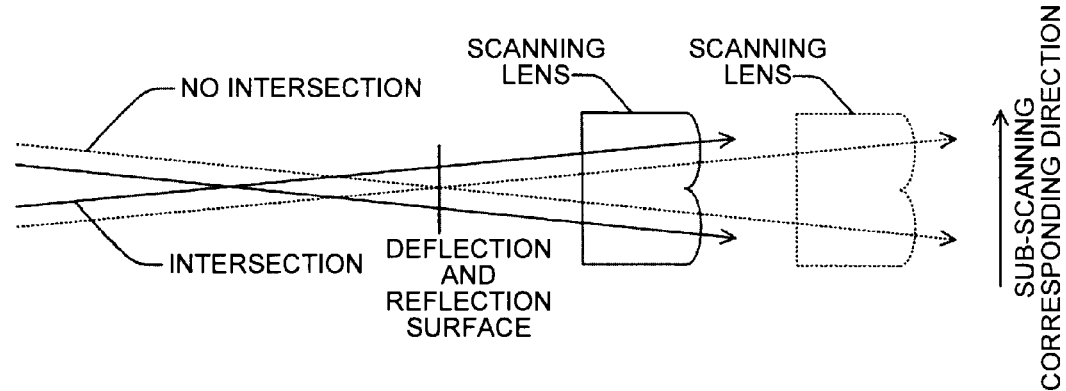
FIG. 22 is an explanatory diagram illustrating an effect of intersecting the two light beams incident on the same deflecting reflective surface prior to the incidence with respect to the sub-scanning corresponding direction.

The two light beams incident on the same deflecting reflective surface once intersect with each other and then are incident on the deflecting reflective surface, so that the oblique incident angle can be made small without increasing the distance between the polygon mirror 2104 and the scanning lens 2105 as illustrated in FIGS. 21 and 22 by way of example.

In this case, the two light beams are incident on different positions of the same deflecting reflective surface with respect to the sub-scanning corresponding direction. Therefore, the thickness of the deflecting reflective surface needs to be increased compared to the case where the conventional obliquely-incident optical system is used. In the present embodiment, however, the thickness of the deflecting reflective surface can be reduced to about 4 mm, and hence a cost increase, an increase in power consumption, and an increase in noise rarely arise. If the two light beams are horizontally incident and the two scanning lenses are disposed by being stacked on each other in the sub-scanning corresponding direction, the thickness of the deflecting reflective surface often becomes about 8 to 10 mm.

Each cylindrical lens is disposed at a position where the two light beams intersect with each other with respect to the Z-axis direction. In this case, the change in the incident position of each light beam on the deflecting reflective surface is small even if each cylindrical lens is shifted to a certain extent in the optical axis direction. Thus, the degree of freedom with respect to the position of each cylindrical lens can be made larger. For instance, even if the position of the cylindrical lens is adjusted so as to adjust the field curvature in the sub-scanning corresponding direction, the influence thereof on other portions of the optical scanning device 2010 is small.

In each cylindrical lens, because the two light beams pass through a position in the vicinity of the optical axis, they are less likely to be influenced by a manufacturing error of the cylindrical lens. In each cylindrical lens, when the two light beams pass through a position distant from the optical axis thereof, if there is a variation in the cylindrical lens due to the manufacturing error thereof, the light beam that has passed through one cylindrical lens and the other light beam that has passed through the other cylindrical lens have different image forming positions from each other with respect to the main scanning direction. This difference cannot be adjusted by shifting a coupling lens in the optical axis direction thereof.

In the color printer 2000 according to the present embodiment, a cost reduction and improvement in image quality can be achieved because the color printer 2000 includes the optical scanning device 2010.

Figure 23:
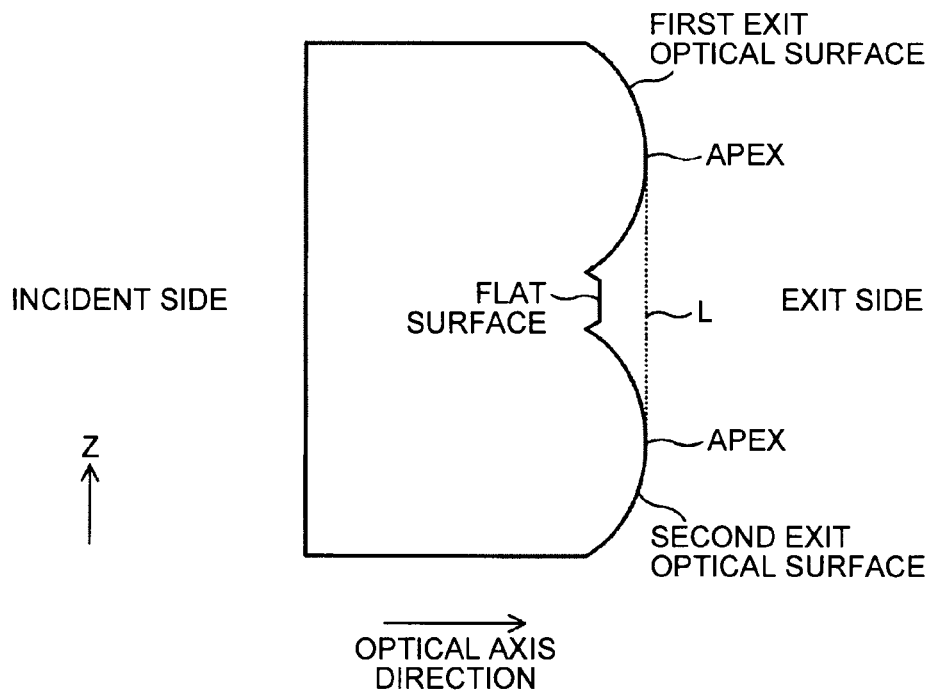
FIG. 23 is an explanatory diagram illustrating a modification example of the scanning lens.

In the embodiment described above, a groove may be formed between a flat surface and each optical surface, as illustrated in FIG. 23 by way of example. In this case, the distance between the flat surface and a line segment L becomes short, and a non-uniform shrinkage in the mold 20 can be further suppressed.

Figure 24:
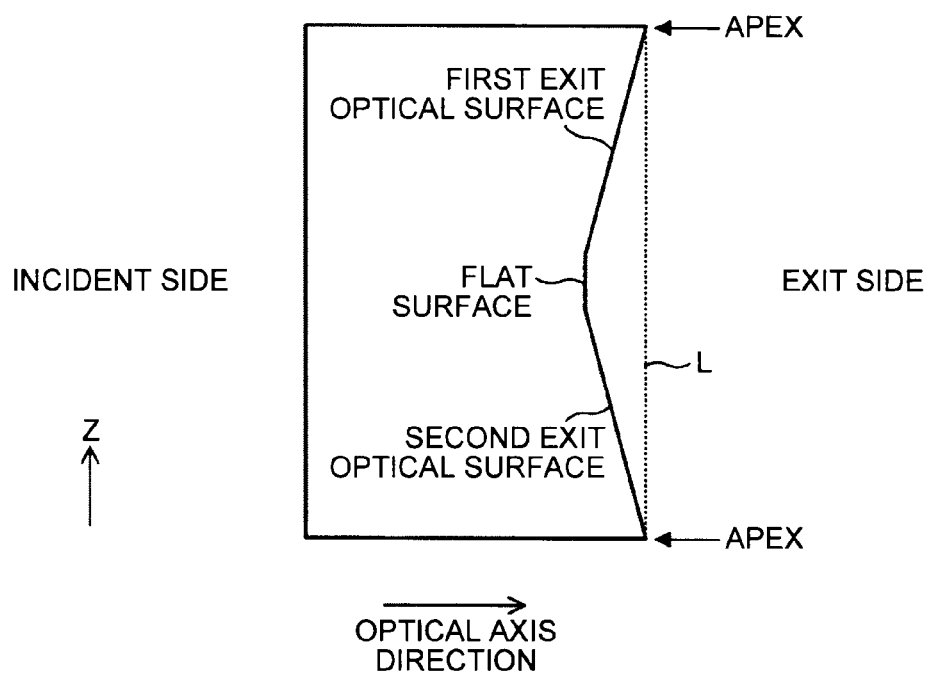
FIG. 24 is an explanatory diagram illustrating another scanning lens 1.

As illustrated in FIG. 24 by way of example, a flat surface is provided between a first exit optical surface and a second exit optical surface in a scanning lens in which the first exit optical surface and the second exit optical surface do not have curvature in the sub-scanning corresponding direction, and have eccentric tilting in the sub-scanning corresponding direction, so that the form accuracy of the first and second exit optical surfaces can be improved even for a resin-molded article.

If a scanning lens does not have eccentric tilting in the sub-scanning corresponding direction in a portion in the main scanning corresponding direction, a flat surface is defined as a plane parallel to a line segment L connecting apexes of two optical surfaces on a surface tilted in the main scanning corresponding direction. The positions of the apexes of the optical surfaces are changed by the difference in the widths of the optical surfaces; however, in such a case, the parallelism of the flat surface and the line segment L may be slightly impaired. That is, a flat surface for improving the heat accumulation in a molding piece may be provided between a plurality of optical surfaces.

Figure 25:
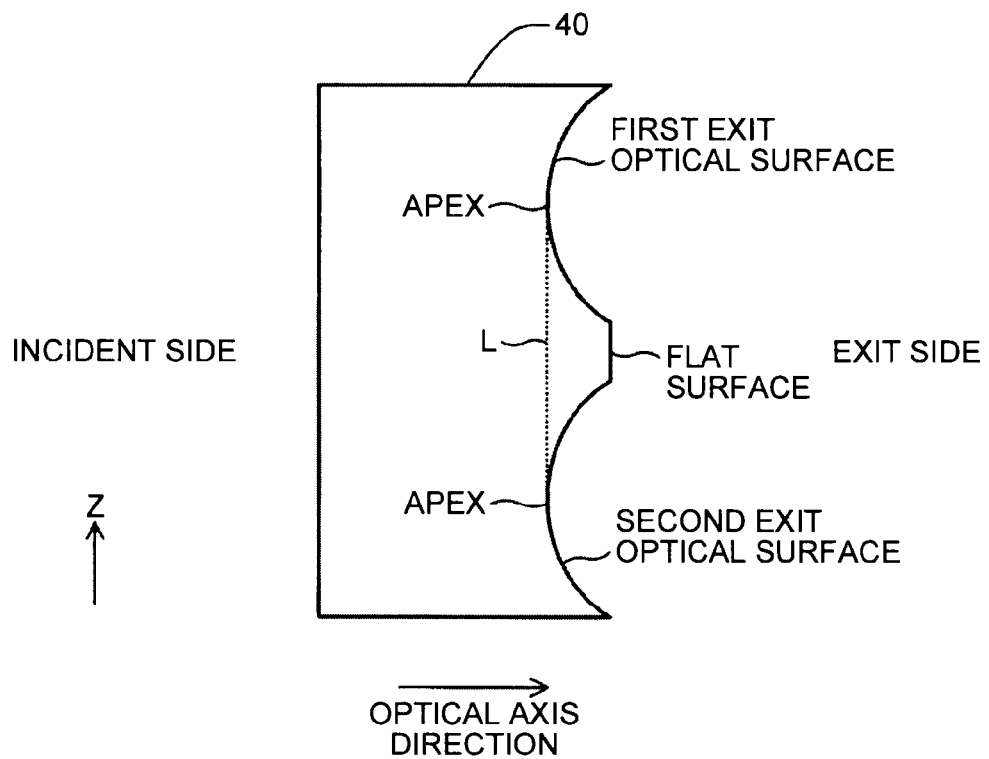
FIG. 25 is an explanatory diagram illustrating still another scanning lens 2.

As illustrated in FIG. 25 by way of example, even in a lens 40 in which a first exit optical surface and a second exit optical surface are provided as concave surfaces, the form accuracy of the first and second exit optical surfaces can be improved by providing a flat surface between the first exit optical surface and the second exit optical surface.

Figure 26:
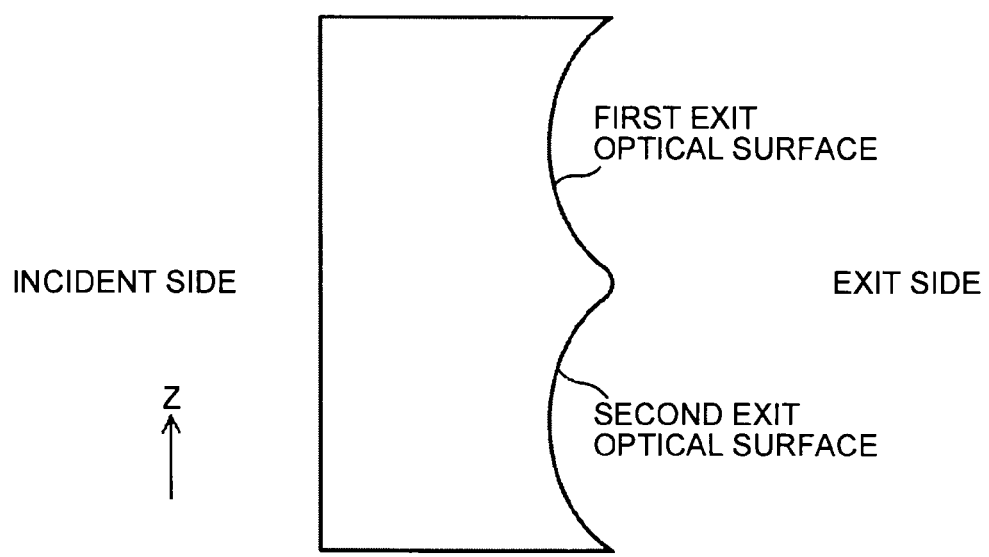
FIG. 26 is an explanatory diagram illustrating a comparative example of the still another scanning lens 2.

As illustrated in a comparative example of FIG. 26, if the flat surface is not provided between a first exit optical surface and a second exit optical surface, heat is not accumulated because a surface on a cavity side of a molding piece has a convex shape; however, because heat dissipation property is locally improved, a non-uniform temperature distribution occurs in the molding piece, thereby degrading an isotropic shrinkage property and form accuracy of the first and second exit optical surfaces.

A groove may be provided between the flat surface and each one of the first and second exit optical surfaces in the lens 40.

Figure 27:
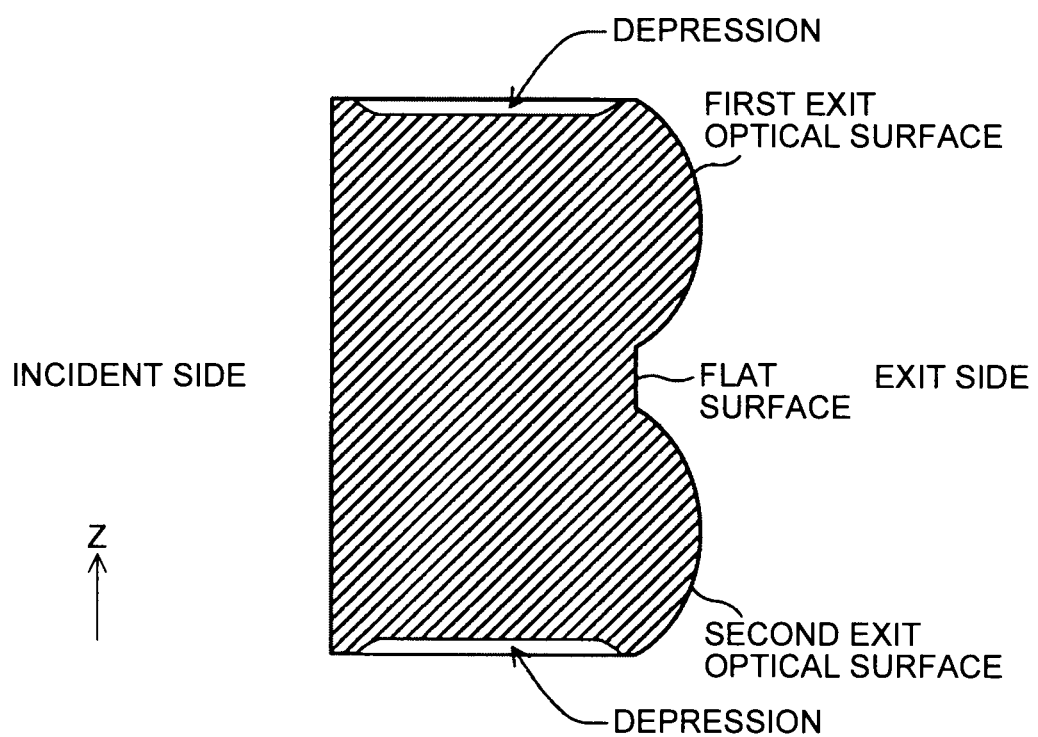
FIG. 27 is an explanatory diagram illustrating a depression formed on a side surface of the scanning lens in the sub-scanning corresponding direction.

In the embodiment described above, as illustrated in FIG. 27 by way of example, a cooling process at the time of molding may be controlled so that a depression is formed on at least one side surface of a scanning lens in the sub-scanning corresponding direction. In this case, the shrinkage concentrates on at least one side surface of the scanning lens in the sub-scanning corresponding direction, and the deformation of an optical surface can be further reduced. In particular, a highly accurate resin-molded article can be realized at a production cost similar to that for manufacturing a thin-molded article even if the scanning lens is thick or has an uneven thickness.

In the embodiment described above, a case in which the four light beams incident on the polygon mirror 2104 are obliquely incident on the deflecting reflective surface thereof has been described; however, the embodiment is not limited thereto. A cost reduction and improvement in scanning accuracy can be achieved by using the scanning lens 2105 even if the four light beams incident on the polygon mirror 2104 are horizontally incident on the deflecting reflective surface thereof.

In the embodiment described above, the description has been given of a case in which the optical scanning device 2010 is used in a printer; however, the optical scanning device 2010 is also suitable for use in an image forming apparatus other than a printer such as a copying machine, a facsimile, or a multifunction peripheral (MFP) in which above-listed devices are intensively included.

Various attempts have been made by the inventors of the embodiment in experiments and computer simulations on a scanning lens that is an article molded by resin injection and has a shape in which a plurality of optical surfaces is disposed along the sub-scanning direction. Then, it has been found that a shape of a region connecting two optical surfaces greatly influences the form accuracy of the optical surfaces.

In the embodiment, cost reduction and improvement in scanning accuracy are achieved because a scanning lens that has a plurality of optical surfaces with high form accuracy is shared by a plurality of light beams. Therefore, cost reduction and improvement in image quality can be achieved.

Accordingly, form accuracy of each optical surface can be improved.

Accordingly, a scanning lens excellent in form accuracy of each optical surface can be molded.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. An optical scanning device that scans a plurality of surfaces to be scanned in a main scanning direction by using a light beam, the optical scanning device comprising:
   a plurality of light sources;
   a light deflector that deflects a plurality of light beams emitted from the light sources; and a scanning optical system that individually guides each one of the light beams deflected by the light deflector to a corresponding one of the surfaces to be scanned, wherein the scanning optical system includes one scanning lens shared by the light beams, and at least one surface of the scanning lens has a plurality of optical surfaces corresponding to the plurality of light beams disposed in a sub-scanning direction with a flat surface provided between the optical surfaces.

2. The optical scanning device according to claim 1, wherein an angle formed by the flat surface and each one of the optical surfaces at a boundary therebetween is an obtuse angle.

3. The optical scanning device according to claim 2, wherein the flat surface is substantially parallel to a line segment connecting apexes of the optical surfaces disposed on both sides of the flat surface.

4. The optical scanning device according to claim 1, wherein the flat surface is substantially parallel to a line segment connecting apexes of the optical surfaces disposed on both sides of the flat surface.

5. The optical scanning device according to claim 1, wherein the flat surface is substantially parallel to a rotation axis of the light deflector.

6. The optical scanning device according to claim 1, wherein a boundary between the flat surface and each one of the optical surfaces is a curved surface.

7. The optical scanning device according to claim 1, wherein the flat surface has lower reflectance than the optical surfaces.

8. The optical scanning device according to claim 1, wherein the scanning lens includes a depression on at least one side surface in the sub-scanning direction.

9. The optical scanning device according to claim 1, wherein the light beams incident on the scanning lens are tilted with respect to a plane perpendicular to a rotation axis of the light deflector.

10. The optical scanning device according to claim 1, wherein a surface on an incident side of the scanning lens includes an optical surface.

11. An image forming apparatus comprising:

a plurality of image carriers; and the optical scanning device according to claim 1 for scanning the image carriers with a light beam modulated according to corresponding pieces of image information.

* * * * *